(12) United States Patent
Cho et al.

(10) Patent No.: US 8,294,856 B2
(45) Date of Patent: Oct. 23, 2012

(54) DISPLAY SUBSTRATE, METHOD OF MANUFACTURING THE SAME AND DISPLAY PANEL HAVING THE DISPLAY SUBSTRATE

(75) Inventors: Seon-Ah Cho, Busan (KR); Hee-Wook Do, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 615 days.

(21) Appl. No.: 12/496,764

(22) Filed: Jul. 2, 2009

(65) Prior Publication Data

US 2010/0134732 A1 Jun. 3, 2010

(30) Foreign Application Priority Data

Dec. 2, 2008 (KR) .......................... 10-2008-121117

(51) Int. Cl.
*G02F 1/1368* (2006.01)
*G02F 1/1343* (2006.01)

(52) U.S. Cl. .......... 349/114; 349/42; 349/106; 349/110; 349/143

(58) Field of Classification Search .............. 349/42, 349/106, 110, 114, 122, 139, 143; 257/59, 257/72; 345/92
See application file for complete search history.

(56) References Cited

U.S. PATENT DOCUMENTS

| | | | | |
|---|---|---|---|---|
| 7,072,012 B2 * | 7/2006 | Jeong et al. | ................... | 349/114 |
| 7,133,104 B2 * | 11/2006 | Kim et al. | ..................... | 349/147 |
| 7,560,316 B2 * | 7/2009 | Heo et al. | ..................... | 438/149 |
| 7,710,520 B2 * | 5/2010 | Rho | ............................. | 349/113 |
| 7,894,027 B2 * | 2/2011 | Park et al. | ..................... | 349/113 |
| 7,986,386 B2 * | 7/2011 | Kwon et al. | ................. | 349/114 |
| 2010/0053518 A1 * | 3/2010 | Jeong et al. | ................... | 349/114 |

* cited by examiner

*Primary Examiner* — Dung Nguyen
*Assistant Examiner* — Tai Duong
(74) *Attorney, Agent, or Firm* — Cantor Colburn LLP (57) ABSTRACT

A display substrate includes a base substrate, a gate line, a first insulation layer, a semiconductor layer, a data line, a switching element, a light-blocking member, a reflective electrode, a second insulation layer and a transmissive electrode. The switching element is defined by a gate electrode, a source electrode and a drain electrode spaced apart from a source electrode. The light-blocking member includes a first light-blocking part disposed in correspondence with an area where the gate line and the data line are disposed, and a second light-blocking part is disposed in a reflective area to include an embossing pattern. The reflective electrode is disposed on the second light-blocking part. The second insulation layer is disposed in a pixel area of the reflective electrode. The transmissive electrode is disposed on the second insulation layer in correspondence with a transmissive area of the pixel area.

14 Claims, 7 Drawing Sheets

DISPLAY SUBSTRATE, METHOD OF MANUFACTURING THE SAME AND DISPLAY PANEL HAVING THE DISPLAY SUBSTRATE

This application claims priority to Korean Patent Application No. 2008-121117, filed on Dec. 2, 2008, and all the benefits accruing therefrom under 35 U.S.C. §119, the contents of which are herein incorporated by reference in their entirety.

BACKGROUND OF THE INVENTION

1. Field of the Invention

Exemplary embodiments of the present invention relate to a display substrate, a method of manufacturing the display substrate and a display panel having the display substrate. More particularly, exemplary embodiments of the present invention relate to a display substrate applicable to transmissive and reflective-type liquid crystal display ("LCD") device, a method of manufacturing the display substrate and a display panel having the display substrate.

2. Description of the Related Art

Liquid crystal display ("LCD") devices may be classified into transmissive-type LCD devices, reflective-type LCD devices and transflective-type LCD devices in accordance with light sources. Since a transmissive-type LCD device has relatively high visibility and color reproducibility in an indoor environment, it is widely used. However, the transmissive-type LCD device has relatively low visibility in an outdoor environment, and power consumption thereof is high.

In contrast, a reflective-type LCD device has relatively high visibility in an outdoor environment. However, the visibility thereof is remarkably reduced in a dark place or cloudy weather.

Accordingly, a transflective-type LCD device has been developed, which has advantages of both the transmissive-type LCD device and the reflective-type LCD device. However, the transflective-type LCD device is more disadvantageous in terms of optical structure or manufacturing process than the transmissive-type LCD device and the reflective-type LCD device. For example, in the transflective-type LCD device, the number of light paths passing through a liquid crystal layer corresponding to a transmissive area is one, while the number of light paths passing through a liquid crystal layer corresponding to a reflective area is two. That is, incident light incident into the reflective area passes through the liquid crystal layer, and then the incident light is reflected by a reflective electrode to again pass through the liquid crystal layer, so that the number of light paths is two in the reflective area. Thus, a phase delay difference is undesirably generated between the transmissive area and the reflective area.

To solve the disadvantages, the transflective-type LCD device employs a dual cell gap structure in which the thickness of an organic insulation layer is controlled, so that a cell gap of a liquid crystal layer corresponding to the transmissive area is double that of a cell gap of a liquid crystal layer corresponding to the reflective area. However, a manufacturing process of the transflective-type LCD device is relatively complicated due to a process of controlling the width of the organic insulation layer. Thus, the productivity of the transflective-type LCD may be undesirably reduced.

In addition, in the transflective-type LCD device, a surface of the organic insulation layer is embossed to improve the reflection efficiency of the reflective area, and then a reflective electrode is formed on a final layer. Thus, two photolithography processes are added with respect to a manufacturing process of the transmissive-type LCD device, so that a manufacturing process of the transflective-type LCD device may be undesirably complicated.

BRIEF SUMMARY OF THE INVENTION

Exemplary embodiments of the present invention provide a display substrate manufactured by simplified manufacturing process to improve the reliability of product.

Exemplary embodiments of the present invention also provide a method of manufacturing the above-mentioned display substrate.

Exemplary embodiments of the present invention also provide a display panel including the above-mentioned display substrate.

In an exemplary embodiment, a display substrate includes a base substrate, a gate line, a first insulation layer, a semiconductor layer, a data line, a switching element, a light-blocking member, a reflective electrode, a second insulation layer and a transmissive electrode. The base substrate includes a pixel area including a reflective area and a transmissive area which are defined therein. The gate line is connected to a gate electrode. The first insulation layer is disposed on the gate line. The semiconductor layer is disposed on the gate electrode and the first insulation layer. The data line is disposed on the first insulation layer. The data line crosses the gate line. The switching element is defined by the gate electrode, a source electrode extended from the data line to overlap with a first end portion of the semiconductor layer, and a drain electrode spaced apart from the source electrode to overlap with a second end portion of the semiconductor layer. The light-blocking member includes a first light-blocking part disposed in correspondence with an area where the gate line and the data line are disposed, and a second light-blocking part disposed in the reflective area to include an embossing pattern. The reflective electrode is disposed on the second light-blocking part. The second insulation layer is disposed in the pixel area of the reflective electrode. The transmissive electrode is disposed on the second insulation layer in correspondence with the transmissive area.

In an exemplary embodiment, the reflective electrode may include a plurality of a first electrode portion having a first width. The transmissive electrode may include a plurality of a second electrode portion having a second width smaller than the first width.

In an exemplary embodiment, there is provided a method of manufacturing a display substrate. In the method, a gate electrode is formed on a base substrate in which a pixel area including a reflective area and a transmissive area is defined, by patterning a gate metal layer. A semiconductor pattern is formed on the base substrate including the gate electrode formed thereon. The semiconductor pattern includes a semiconductor layer and an ohmic contact layer. A source electrode, a drain electrode and a reflective electrode are formed by patterning a source metal layer on the base substrate including the semiconductor pattern. The reflective electrode is extended from the drain electrode to be disposed in the reflective area. An organic insulation layer is formed on the base substrate including the reflective electrode formed thereon. A transmissive electrode electrically connected to the drain electrode is formed in the transmissive area of the organic insulation layer.

In an exemplary embodiment, a display panel includes a display substrate, an opposite substrate and a liquid crystal layer. The display substrate includes a base substrate, a plurality of gate lines, a first insulation layer, a semiconductor layer, a data line, a plurality of pixel areas, a switching element, a light-blocking member, a reflective electrode, a second insulation layer and a transmissive electrode. The base substrate includes a pixel area including a reflective area and a transmissive area which are defined therein. The gate line is connected to a gate electrode. The first insulation layer is disposed on the gate line. The semiconductor layer is disposed on the gate electrode and the first insulation layer. The data line is disposed on the first insulation layer. The data line crosses the gate line. The switching element is defined by the gate electrode, a source electrode extended from the data line to overlap with a first end portion of the semiconductor layer, and a drain electrode spaced apart from the source electrode to overlap with a second end portion of the semiconductor layer. The light-blocking member includes a first light-blocking part disposed in correspondence with an area where the gate line and the data line are disposed, and a second light-blocking part disposed in the reflective area to include an embossing pattern. The reflective electrode is disposed on the second light-blocking part. The second insulation layer is disposed in the pixel area of the reflective electrode. The transmissive electrode is disposed on the second insulation layer in correspondence with the transmissive area. The opposite substrate includes a common electrode disposed in correspondence with the reflective and transmissive electrode. The liquid crystal layer interposed between the display substrate and the opposite substrate.

In an exemplary embodiment, a method of manufacturing the display substrate and a display panel including the display substrate, a reflective electrode is disposed on the same plane (e.g., layer of the display substrate) as that of a drain electrode of a switching element TFT, and includes the same material as that of the drain electrode, so that a manufacturing process thereof may be simplified.

BRIEF DESCRIPTION OF THE DRAWINGS

The above and other features and advantages of the present invention will become more apparent by describing in detailed exemplary embodiments thereof with reference to the accompanying drawings, in which:

FIGS. 3A to 3C are cross-sectional views illustrating an exemplary embodiment of a manufacturing process of the display substrate of FIG. 2;

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Embodiment 1

Figure 1:
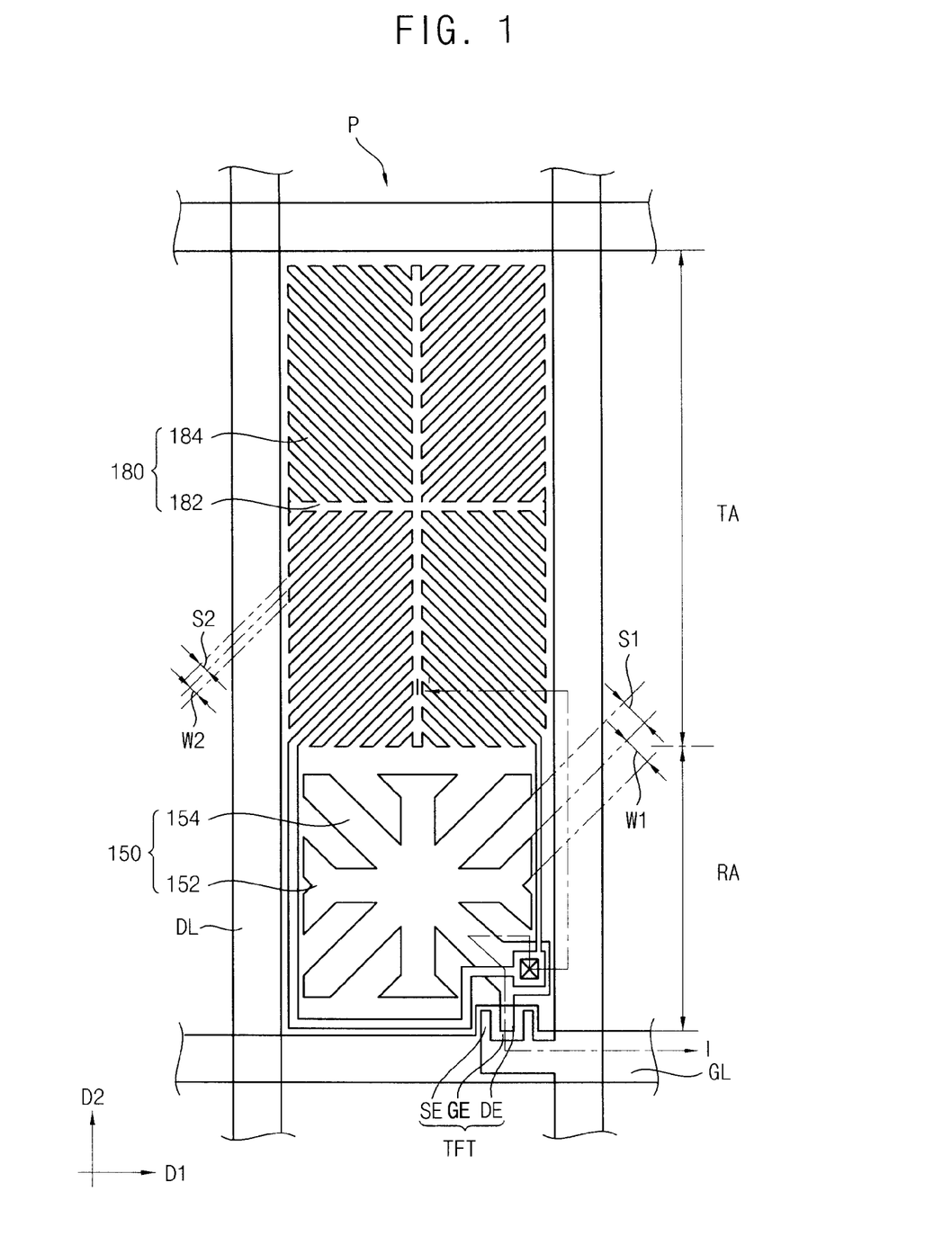
FIG. 1 is a plan view illustrating a display panel according to Embodiment 1 of the present invention.
Figure 2:
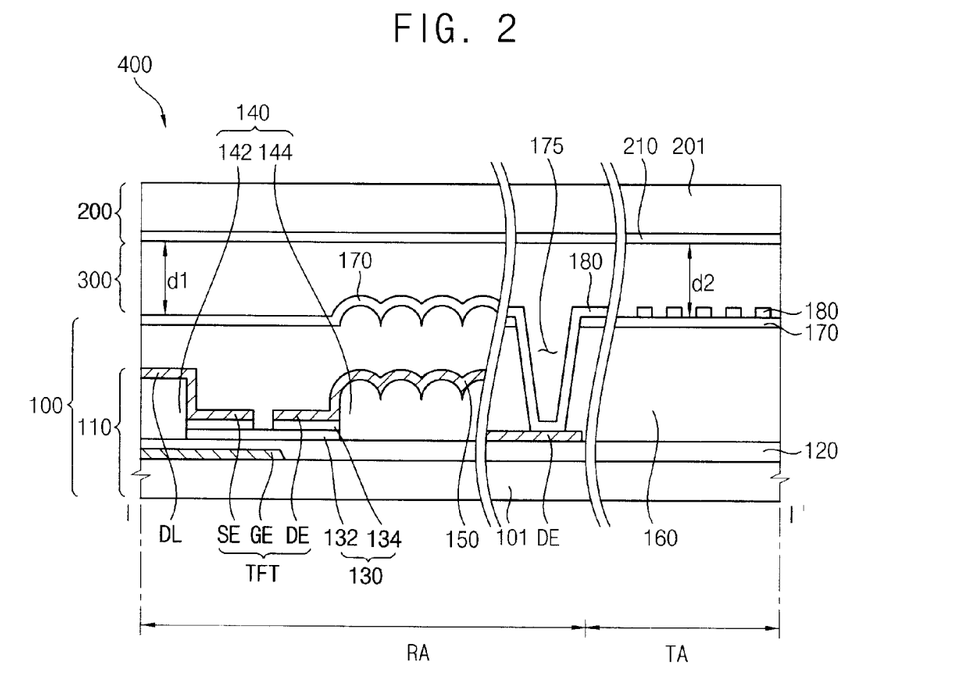
FIG. 2 is a cross-sectional view taken along line I-I' in FIG. 1.

FIG. 1 is a plan view illustrating a display panel 400 according to Embodiment 1 of the present invention. FIG. 2 is a cross-sectional view taken along line I-I' in FIG. 1.

Referring to FIGS. 1 and 2, the display panel 400 includes a display substrate 100, an opposite substrate 200 disposed facing the display substrate 100, and a liquid crystal layer 300 interposed between the display substrate 100 and the opposite substrate 200.

The display substrate 100 includes a first base substrate 101 including a plurality of a pixel area P disposed therein. The first base substrate 101 may include a transparent insulation material. The pixel area P includes a reflective area RA and a transmissive area TA. The pixel area P may be defined as an independent area unit capable of independently controlling portions of the liquid crystal layer 300.

The display substrate 100 may further include an array layer 110 disposed on the first base substrate 101, a color filter layer 160, a passivation film 170 and a transmissive electrode 180.

The array layer 110 includes a gate line GL disposed on the first base substrate 101, a data line DL, a switching element TFT electrically connected to the gate line GL and the data line DL, a gate insulation layer 120, a semiconductor pattern 130, a light-blocking member 140 and a reflective electrode 150.

The gate line GL is extended in a first direction D1, and the data line DL is extended in a second direction D2 crossing the first direction D1. A plurality of the gate line GL may be disposed substantially in parallel with each other, and a plurality of the data line DL may be disposed substantially in parallel with each other. The first direction D1 may be inclined with respect to the second direction D2, such as being substantially perpendicular to the first direction D1.

The gate insulation layer 120 is disposed directly on the first base substrate 101 including the gate line GL and a gate electrode GE of the switching element TFT disposed thereon.

The switching element TFT includes the gate electrode GE, a source electrode SE, the semiconductor pattern 130 and a drain electrode DE. The switching element TFT may be disposed in the reflective area RA, such that an entire of the switching element TFT is disposed within boundaries of the reflective area RA. The gate electrode GE is electrically connected to the gate line GL, and the source electrode SE is electrically connected to the data line DL. In the illustrated embodiment, the source electrode SE is an extension of the data line DL and disposed continuously with the data line DL, such that the source electrode SE is considered electrically connected to the data line DL. In the illustrated embodiment, the gate electrode GE is an extension of the gate line GL and disposed continuously with the gate line GL, such that the gate electrode SE is considered electrically connected to the gate line GL.

The semiconductor pattern 130 is disposed directly on the gate insulation layer 120 in correspondence with the gate electrode GE, such that the semiconductor pattern 130 overlaps a portion of the gate electrode GE. The semiconductor pattern 130 may include a semiconductor layer 132 and an ohmic contact layer 134. The drain electrode DE is spaced apart from the source electrode SE with respect to the gate electrode GE.

The blocking member 140 includes a first light-blocking part 142 and a second light-blocking part 144. The first light-blocking part 142 is disposed in correspondence with an area where the gate line GL and the data line DL are disposed, such as in the reflective area RA. In the illustrated exemplary embodiment, the first light-blocking part 142 may overlap a portion of both the data line DL and the gate line GL, such that the first light-blocking part 142 is disposed between the portions of the data line DL and the gate line GL. A surface of the first light-blocking part 142 may be flattened, or disposed substantially planar.

The second light-blocking part 144 is disposed in the reflective area RA. In the illustrated exemplary embodiment, the second light-blocking part 144 may be disposed between the first base substrate 101 and the reflective electrode 150. The second light-blocking part 144 may directly contact the reflective electrode 150, and portions of the semiconductor layer 130 and a portion of the gate insulating layer 120. A surface of the second light-blocking part 144 includes an embossing pattern to improve the reflection efficiency of the reflective area RA.

The reflective electrode 150 is disposed directly on the light-blocking member 140, and overlapping the embossing pattern of the second light-blocking part 144. The reflective electrode 150 is disposed on the same plane (e.g., layer of the display substrate 100) as that of the source electrode SE and the drain electrode DE. The reflective electrode 150 may include the same material as that of the source electrode SE and the drain electrode DE. In the illustrated exemplary embodiment, the reflective electrode 150 is extended from the drain electrode DE to be disposed in the reflective area RA, and is disposed continuously with the drain electrode DE.

Referring to FIG. 1, the reflective electrode 150 includes a first body portion 152 and a plurality of a first electrode portion 154. The first body portion 152 is longitudinally extended both in the first direction D1 and in the second direction D2 to have a cross shape. The first body portion 152 may include a first member longitudinally extended in the first direction D1 and a second member longitudinally extended in the second direction D2.

The first electrode portions 154 are protruded from the first body portions 152 toward directions different from each other to define a plurality of domains. The first electrode portions 154 may each be inclined with respect to the first body portions 152.

A width W1 of the first electrode portions 154 is substantially larger than an interval S1 between first electrode portions 154 which are adjacent to each other. The width W1 is taken substantially perpendicular to a longitudinal direction of the first electrode portion 154. When the width W1 of the first electrode portions 154 is larger than the interval S1 between the adjacent first electrode portions 154, the reflection efficiency of the reflective area RA may advantageously be increased.

The color filter layer 160 is disposed in both the reflective area RA and the transmissive area TA, and corresponds to (e.g., overlap or align with) the reflective electrode 150. The color filter layer 160 is disposed directly on and contacting the reflective electrode 150 corresponding to the reflective area RA, and is disposed directly on and contacting the gate insulation layer 120 corresponding to the transmissive area TA. A surface shape of the color filter layer 160 disposed in the reflective area RA may include an embossing pattern due to the shape of the second light-blocking part 144. A contact hole 175 exposing a terminal of the drain electrode DE is disposed extending completely through the color filter layer 160.

The passivation film 170 is disposed on the first base substrate 101 including the color filter layer 160 disposed thereon. The passivation layer 170 may be disposed overlapping substantially a whole of the first base substrate 101, and may define an uppermost layer of a portion of the display substrate 100, such as in the reflective area RA. The reflective electrode 150 is disposed between the color filter layer 160 and the first base substrate 101, and is not a final or uppermost layer of the display substrate 100.

The transmissive electrode 180 may include an optically transparent and electrically conductive material. The transmissive electrode 180 is disposed in the transmissive area TA of the first base substrate 101 including the passivation film 170 disposed thereon. The transmissive electrode 180 is electrically connected to the drain electrode DE of the switching element TFT through the contact hole 175.

Referring to FIG. 1, the transmissive electrode 180 includes a second body portion 182 and a plurality of second electrode portions 184. The second body portion 182 is extended in the first direction D1 and in the second direction D2, and has a cross shape. The second body portion 182 may include a first member longitudinally extended in the first direction D1 and a second member longitudinally extended in the second direction D2.

The second electrode portions 184 are protruded from the second body portion 182 toward directions different from each other to define a plurality of domains. The second electrode portions 184 may each be inclined with respect to the second body portions 182.

The reflective area RA may include a portion of the pixel area P where both the reflective electrode 150 and the transmissive electrode 180 are disposed, or where only the reflective electrode 150 is disposed. In contrast, the transmissive area TA includes a portion of the pixel area P where only the transmissive electrode 180 is disposed, such as where the reflective electrode is not disposed. The transmissive area TA may be defined as a portion of the pixel area P except for where the reflective electrode 150 is disposed.

A width W2 of the second electrode portions 184 is substantially greater than an interval S2 between second electrode portions 184 which are adjacent to each other. The width W2 is taken substantially perpendicular to a longitudinal direction of the second electrode portion 184. A width W2 of the second electrode portions 184 and an interval S2 between the adjacent second electrode portions 184 are each smaller than a width W1 of the first electrode portions 154 and an interval S1 between the adjacent first electrode portions 154.

In one exemplary embodiment, when a width W2 and an interval S2 of the second electrode portions 184 are respectively about 3 micrometers (μm), a width W1 and an interval S1 of the first electrode portions 154 may be respectively about 5 micrometers (μm).

A thickness of the color filter layer 160 disposed in the reflective area RA may be greater than or equal to a thickness of the color filter layer 160 disposed in the transmissive area TA. The thickness is taken in a third direction substantially perpendicular to the first base substrate 101, and orthogonal to both the first direction D1 and the second direction D2. An uppermost point at a first height of the color filter layer 160 disposed in the reflective area RA may be located further from the first base substrate 101 than an uppermost point at a second height of the color filter layer 160 in the transmissive area TA, the heights taken in the third direction.

According to the above, the thicknesses of the color filter layer 160 respectively disposed in the reflective area RA and the transmissive area TA are adjusted, so that a phase delay in the reflective area RA and the transmissive area TA may be compensated for. In the illustrated exemplary embodiment, the transmissive electrode 180 is disposed in an area where the color filter layer 160 and the protective layer 170 are sequentially stacked thereon, while the reflective electrode 150 is disposed below the color filter layer 160. An interval in the third direction between a common electrode 210 disposed on the opposite substrate 200 and the reflective electrode 150, is greater than an interval in the third direction between the common electrode 210 and the transmissive electrode 180. Advantageously, the thickness of the color filter layer 160 disposed in the reflective area RA is varied only slightly, and thus a phase delay may be advantageously compensated for in the reflective area RA and the transmissive area TA.

The opposite substrate 200 includes a second base substrate 201 and the common electrode 210.

The second base substrate 201 may include a transparent insulation material.

The common electrode 210 may include an optically transparent and electrically conductive material. The common electrode 210 is disposed on the second base substrate 201. The common electrode 210 faces the reflective electrode 150 and the transmissive electrode 180, and has a substantially planar structure. In the illustrated embodiment, the common electrode 210 is disposed on an entire surface of the second base substrate 201.

The liquid crystal layer 300 is interposed between the display substrate 100 and the opposite substrate 200. The liquid crystal layer 300 may include a plurality of a liquid crystal molecule (not shown). A cell gap d1 of the liquid crystal layer 300 corresponding to the reflective area RA is substantially equal to a cell gap d2 of the liquid crystal layer 300 corresponding to the transmissive area TA.

Hereinafter, a manufacturing process of the display substrate 100 as shown in FIG. 2 will be described with reference to FIGS. 1, 2 and 3A to 3C.

Figure 3A:
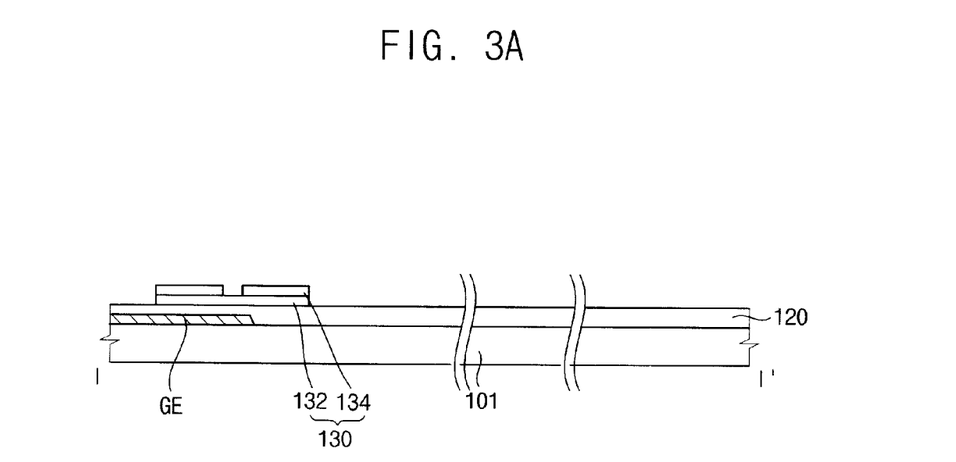
Figure 3B:
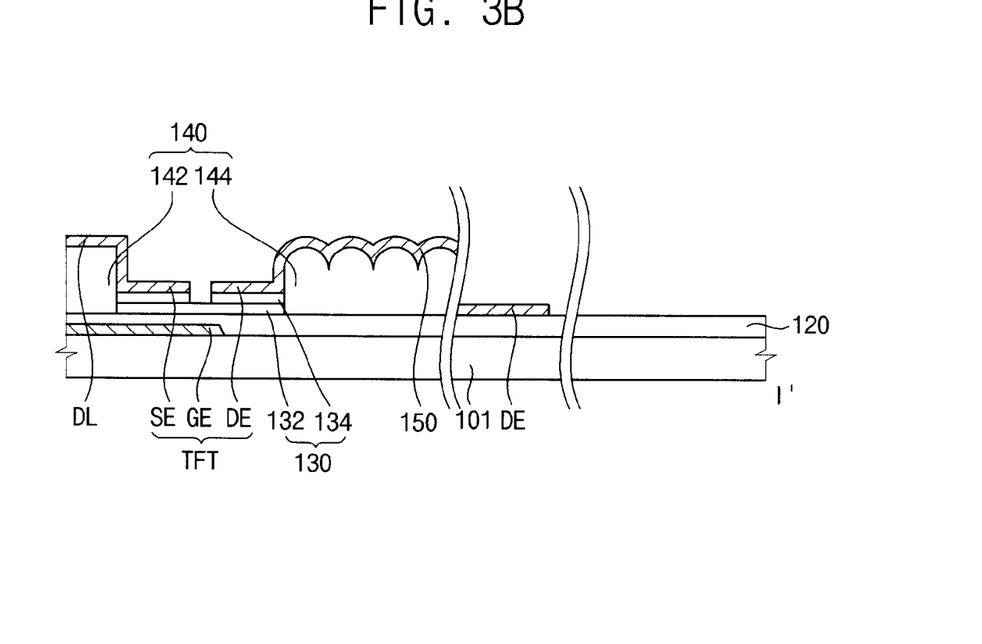
Figure 3C:
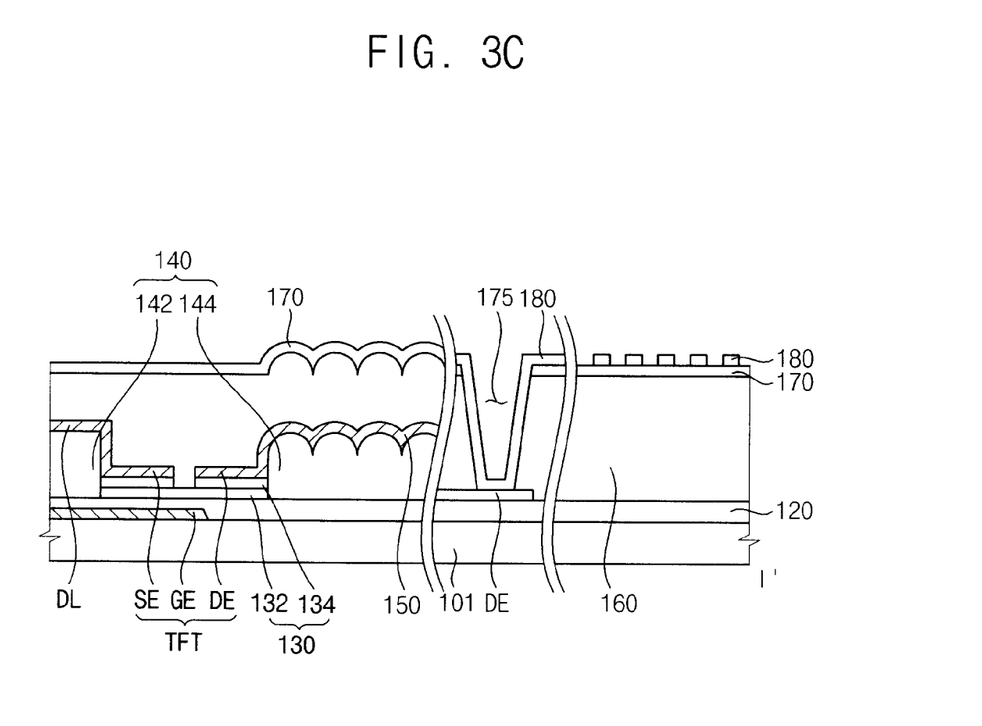

FIGS. 3A to 3C are cross-sectional views illustrating an exemplary embodiment of a manufacturing process of the display substrate of FIG. 2.

Referring to FIGS. 2 and 3A, a gate metal layer is formed on the first base substrate 101 The gate metal layer is patterned to form the gate line GL and the gate electrode GE.

The gate insulation layer 120 is formed on the first base substrate 101 including the gate metal pattern formed thereon. The gate insulation layer 120 may include a material such as silicon nitride ("SiNx"), silicon oxide ("SiOx"), etc.

The semiconductor layer 132 and the ohmic contact layer 134 are disposed one after another (e.g., sequentially) on the first base substrate 101 including the gate insulation layer 120 formed thereon, and are patterned to form the semiconductor pattern 130. The semiconductor layer 132 may include a material such as amorphous silicon, and the ohmic contact layer 134 may include a material such as amorphous silicon doped with n-type dopants at a relatively high concentration.

Referring to FIGS. 2 and 3B, the first light-blocking part 142 is formed in an area where the gate line GL and the data line DL are formed. The second light-blocking part 144 including an embossing pattern is formed in the reflective area RA, excluding an area including the semiconductor pattern 130 formed thereon.

A source metal layer is formed on the first base substrate 101 including the first and second light-blocking parts 142 and 144 formed thereon. The source metal layer is patterned, such as by an etching process, to form the data line DL, the source electrode SE, the drain electrode DE and the reflective electrode 150. The patterned data line DL, source electrode SE, drain electrode DE and reflective electrode 150 are disposed in a same layer on the display substrate. The formed data line DL, source electrode SE, drain electrode DE and reflective electrode 150 may hereinafter be referred to as the source metal pattern. The reflective electrode 150 is extended from the drain electrode DE to be disposed in the reflective area RA. The reflective electrode 150 is disposed continuously with the drain electrode DE.

Referring to FIGS. 2 and 3C, the color filter layer 160 is formed in both the reflective area RA and the transmissive area TA of the first base substrate 101 including the source metal pattern formed thereon. A surface of the color filter layer 160 may include an embossing pattern due to the shape of the second light-blocking part 144 which includes an upper surface thereof including an embossing pattern.

The passivation film 170 is formed on the first base substrate 101 including the color filter layer 160 formed thereon. The passivation film 170 may include a material, such as silicon nitride ("SiNx"), silicon oxide ("SiOx"), etc.

The passivation film 170 and the color filter layer 160 are exposed, and are developed to form the contact hole 175 exposing a terminal of the drain electrode DE.

A transparent conductive layer is formed in the transmissive area TA of the first base substrate 101. The transparent conductive layer is patterned to form the transmissive electrode 180 including the second electrode portions 184. The transmissive electrode 180 is electrically connected to the drain electrode DE of the switching element TFT through the contact hole 175. The transparent conductive layer may include a material such as indium tin oxide ("ITO"), indium zinc oxide ("IZO"), etc.

Figure 4:
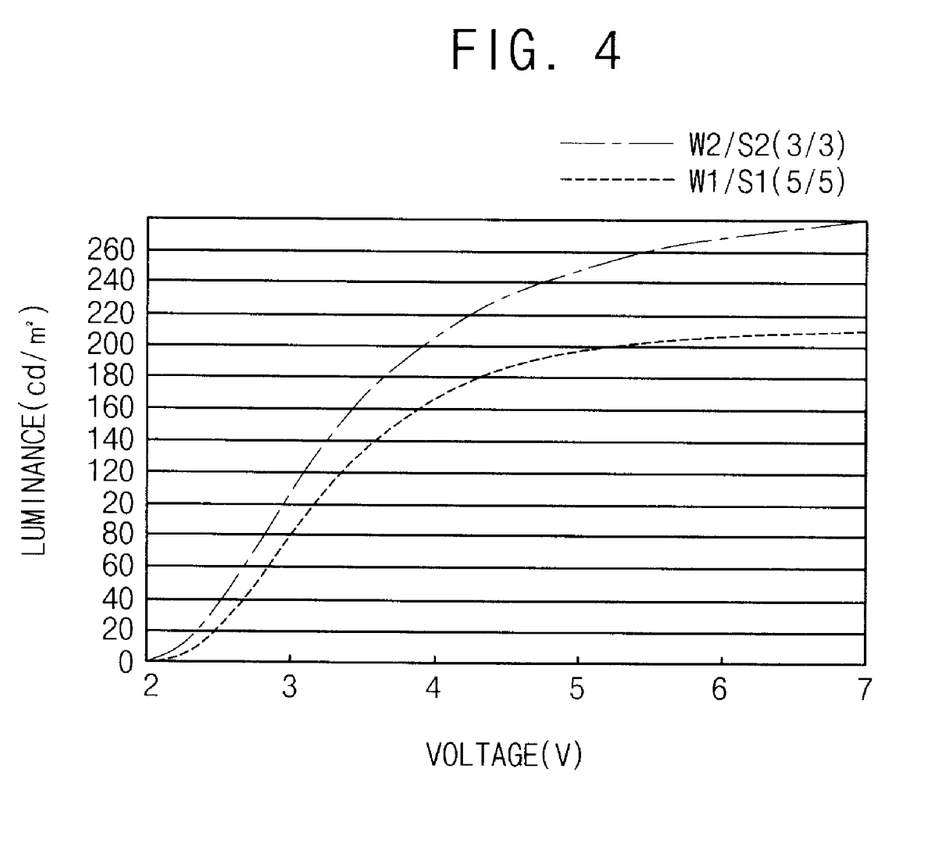
FIG. 4 is a graph illustrating an exemplary embodiment of a luminance distribution according to voltage variation of the display panel of FIG. 1.

FIG. 4 is a graph illustrating an exemplary embodiment of a luminance distribution according to voltage variation of the display panel of FIG. 1.

Referring to FIGS. 1 and 4, when a width W1 and an interval S1 between the adjacent first electrode portions 154 disposed in the reflective area RA were each respectively 5 μm, and a width W2 and an interval S2 between the adjacent second electrode portions 184 disposed in the transmissive area TA were each respectively 3 μm as simulation conditions, a luminance in accordance with an applied voltage V was measured.

As a result of the simulation, it can be seen that the luminance of light transmitted through the reflective area RA was more reduced than the luminance of light transmitted through the transmissive area TA by about 33%. FIG. 4 illustrates a condition where a width W and an interval S of electrode portions are inversely proportional to a luminance.

In addition, when a width W and an interval S between adjacent electrode portions are increased, the strength of a fringe field substantially perpendicular to a final liquid crystal arrangement direction is increased, so that collisions of liquid crystal directors disposed at a terminal of the electrode portions are increased. As a result, the luminance of the display panel is reduced.

According to the illustrated embodiment, although a double cell gap structure is not adopted for compensating for a phase delay in the reflective area RA and the transmissive area TA, the phase delay in the reflective area RA and the transmissive area TA may be advantageously compensated for by adjusting a width and an interval of the reflective electrode 150 and the transmissive electrode 180. Moreover, according to the illustrated embodiment, the reflective electrode 150 is formed on the same plane (e.g., layer of the display substrate 100) as that of the drain electrode DE of the switching element TFT, and is formed of the same material as that of the drain electrode DE of the switching element TFT, so that a manufacturing process of the display panel may be advantageously simplified.

Embodiment 2

Figure 5:
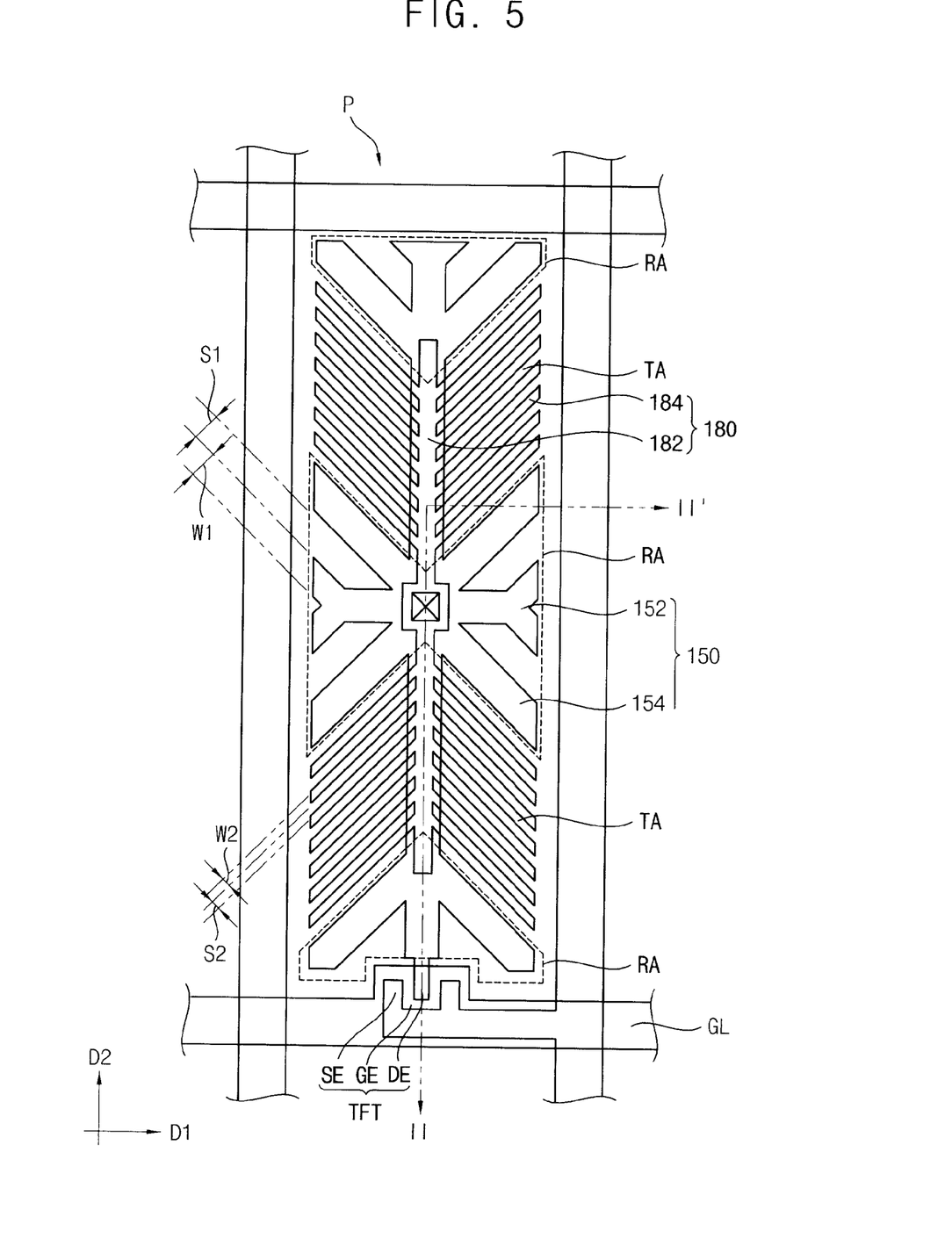
FIG. 5 is a plan view illustrating a display panel according to Embodiment 2 of the present invention.
Figure 6:
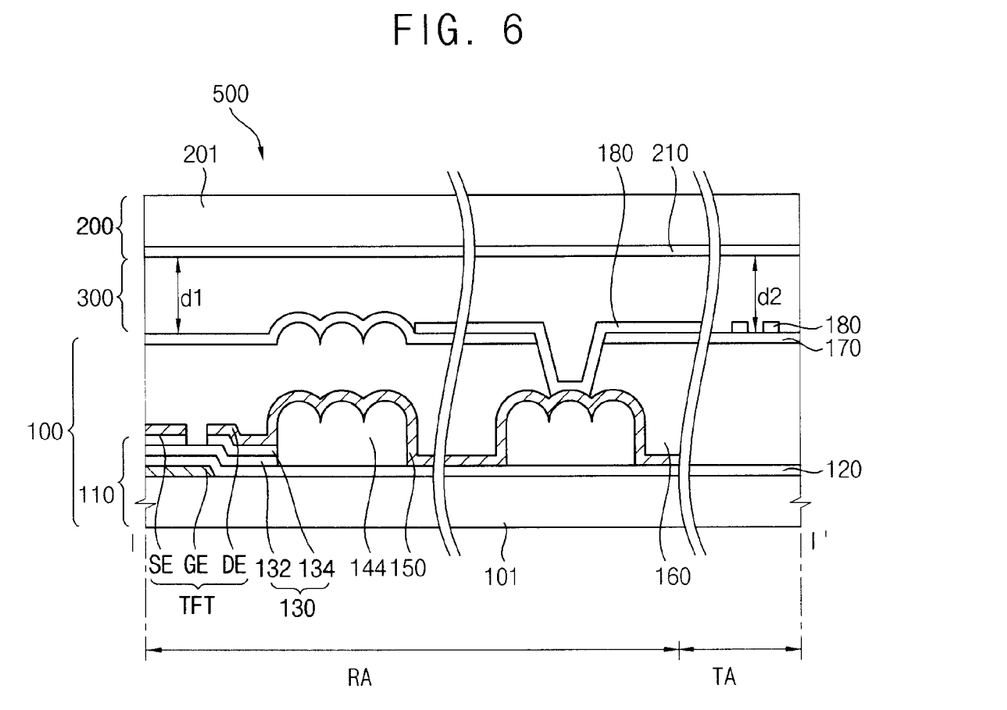
FIG. 6 is a cross-sectional view taken along line II-II' of FIG. 5.

FIG. 5 is a plan view illustrating a display panel according to Embodiment 2 of the present invention. FIG. 6 is a cross-sectional view taken along line II-II' of FIG. 5.

The display panel 500 described in FIGS. 5 and 6 is substantially identical to the display panel 400 according to Embodiment 1 except for the position of a reflective area and a transmissive area. Accordingly, the same reference numerals will be used to refer to the same elements as those described, and any detailed explanation will be omitted.

Referring to FIGS. 5 and 6, the display panel 500 includes a display substrate 100, an opposite substrate 200 opposite the display substrate 100 and a liquid crystal layer 300.

The display substrate 100 includes an array layer 110 disposed on a first base substrate 101, a color filter layer 160, a passivation film 170 and a transmissive electrode 180. A plurality of a sub-reflective area RA and a plurality of a sub-transmissive area TA are alternated in a longitudinal direction of the pixel area P. The plurality of the sub-reflective area RA and the plurality of the sub-transmissive area TA may be collectively referred to as the reflective area RA and the transmissive area TA, respectively. The reflective area RA is indicated by a dotted line in FIG. 5

The reflective electrode 150 is disposed on a second light-blocking part 144 disposed in the reflective area RA. The reflective electrode 150 is disposed on the same plane (e.g., same layer of the display substrate 100) as that of the source electrode SE and the drain electrode DE. The reflective electrode 150 may include the same material as that of the source electrode SE and the drain electrode DE.

The reflective electrode 150 includes a first body portion 152 and a plurality of a first electrode portion 154. The first body portion 152 is extended substantially in the first direction D1 and the second direction D2, and has a cross shape. The first body portion 152 may include a first member longitudinally extended in the first direction D1 and a second member longitudinally extended in the second direction D2.

The first electrode portions 154 are protruded toward directions different from each other to define a plurality of domains. The first electrode portions 154 may each be inclined with respect to the first body portions 152. The first electrode portions 154 are disposed in a central area of a pixel area P and are spaced apart from each other in opposing directions from the central area along the second direction D2.

A width W1 of the first electrode portions 154 and an interval S1 between first electrode portions 154 which are adjacent to each other may each be less than about 5 µm. The width W1 of the first electrode portions 154 may be substantially equal to an interval S1 between the first electrode portions 154 which are adjacent to each other, or may be larger than the interval S1. When the width W1 of the first electrode portions 154 is larger than an interval S1 between the adjacent first electrode portions 154, the reflection efficiency of the reflective area RA may be improved.

The transmissive electrode 180 includes optically transparent and electrically conductive material, and is disposed in the transmissive area TA of the first base substrate 101 including the passivation film 170 disposed thereon. The transmissive electrode 180 includes a second body portion 182 and a plurality of a second electrode portion 184. The second body portion 182 is longitudinally extended in the first direction D1, and has a substantial straight line (e.g., linear) shape.

The second electrode portions 184 are protruded from the first body portion 182 toward directions different from each other to define a plurality of domains. The second electrode portions 184 includes a first member disposed in the central area of the pixel area P and protruding from the first body portion 182 in opposing directions along the first direction D1, and a second member disposed between the first electrode portions 154 along the second direction D2 and disposed on each side of the central area.

A width W2 of the second electrode portions 184 and an interval S2 between the second electrode portions 184 which are adjacent to each other may each be less than about 5 µm. The width W2 of the second electrode portions 184 is substantially equal to the interval S2 between the adjacent second electrode portions 184. The width W2 of the second electrode portions 184 and the interval S2 between the second electrode portions 184 are smaller than the width W1 of the first electrode portions 154 and the interval S1 between the adjacent first electrode portions 154.

An uppermost point at a first height of the color filter layer 160 disposed in the reflective area RA may be located further from the first base substrate 101 than an uppermost point at a second height of the color filter layer 160 in the transmissive area TA, the heights taken in the third direction. According to the above, the heights of the color filter layer 160 respectively disposed in the reflective area RA and the transmissive area TA are adjusted, so that a phase delay in the reflective area RA and the transmissive area TA may be compensated for.

The opposite substrate 200 includes a second base substrate 201 and a common electrode 210.

The common electrode 210 includes an optically transparent and electrically conductive material, and is disposed on the second base substrate 201. The common electrode 210 faces the reflective electrode 150 and the transmissive electrode 180, and has a substantially planar structure.

The liquid crystal layer 300 is interposed between the display substrate 100 and the opposite substrate 200. A cell gap d1 of the liquid crystal layer 300 corresponding to the reflective area RA is substantially equal to a cell gap d2 of the liquid crystal layer 300 corresponding to the transmissive area TA.

The process for forming the display substrate 100 in the illustrated embodiment in FIGS. 5 and 6 is substantially identical to the process for forming the display substrate 100 described in FIGS. 3A to 3C according to Embodiment 1, except for the position of the reflective electrode 150 and the transmissive electrode 180. Accordingly, the same reference numerals will be used to refer to the same elements as those described, and any detailed explanation will be omitted.

A first portion of the reflective electrode 150 is disposed in a central area of a pixel area P, and second portions of the reflective electrode 150 are spaced apart from the first portion along the second direction D2 on each of opposing sides of the central area. The first and second portions of the reflective electrode 150 are disposed continuously with each other. The first portion of the reflective electrode 150 includes an embossed surface and is electrically connected to the transmissive electrode 180 through a contact hole. The second portions of the reflective electrode 150 include an embossed surface and are disposed substantially at a longitudinal distal end of the reflective electrode 150 adjacent to the drain electrode DE.

A first portion of the transmissive electrode 180 is disposed on the central area, and second portions of the transmissive electrode 180 are disposed between adjacent first and second portions of the reflective electrodes 150 which are spaced apart from each other along the second direction D2 on each of opposing sides with respect to the central area.

The transmissive electrode 180 is disposed in an area where the color filter layer 160 and the protective layer 170 are sequentially stacked thereon, while the reflective electrode 150 is disposed below the color filter layer 160. An interval in the third direction between a common electrode 210 disposed on the opposite substrate 200 and the reflective electrode 150, is greater than an interval in the third direction between the common electrode 210 and the transmissive electrode 180. Advantageously, the thickness of the color filter layer 160 disposed in the reflective area RA is varied only slightly, and thus a phase delay may be advantageously compensated for in the reflective area RA and the transmissive area TA.

According to the illustrated embodiment, the phase delay in the reflective area RA and the transmissive area TA may be compensated for by a width and an interval of the reflective electrode 150 and the transmissive electrode 180. Since the reflective electrode 150 is disposed on the same plane (e.g., layer in the display substrate 100) as that of the drain electrode DE of the switching element TFT, and includes the same material as that of the drain electrode DE of the switching element TFT, a process of manufacturing may be advantageously simplified. In addition, as the reflective electrode 150 is disposed in an area in which the arrangement of liquid crystal molecules is irregular to reduce the luminance in the pixel area P, display quality may be advantageously improved.

Embodiment 3

Figure 7:
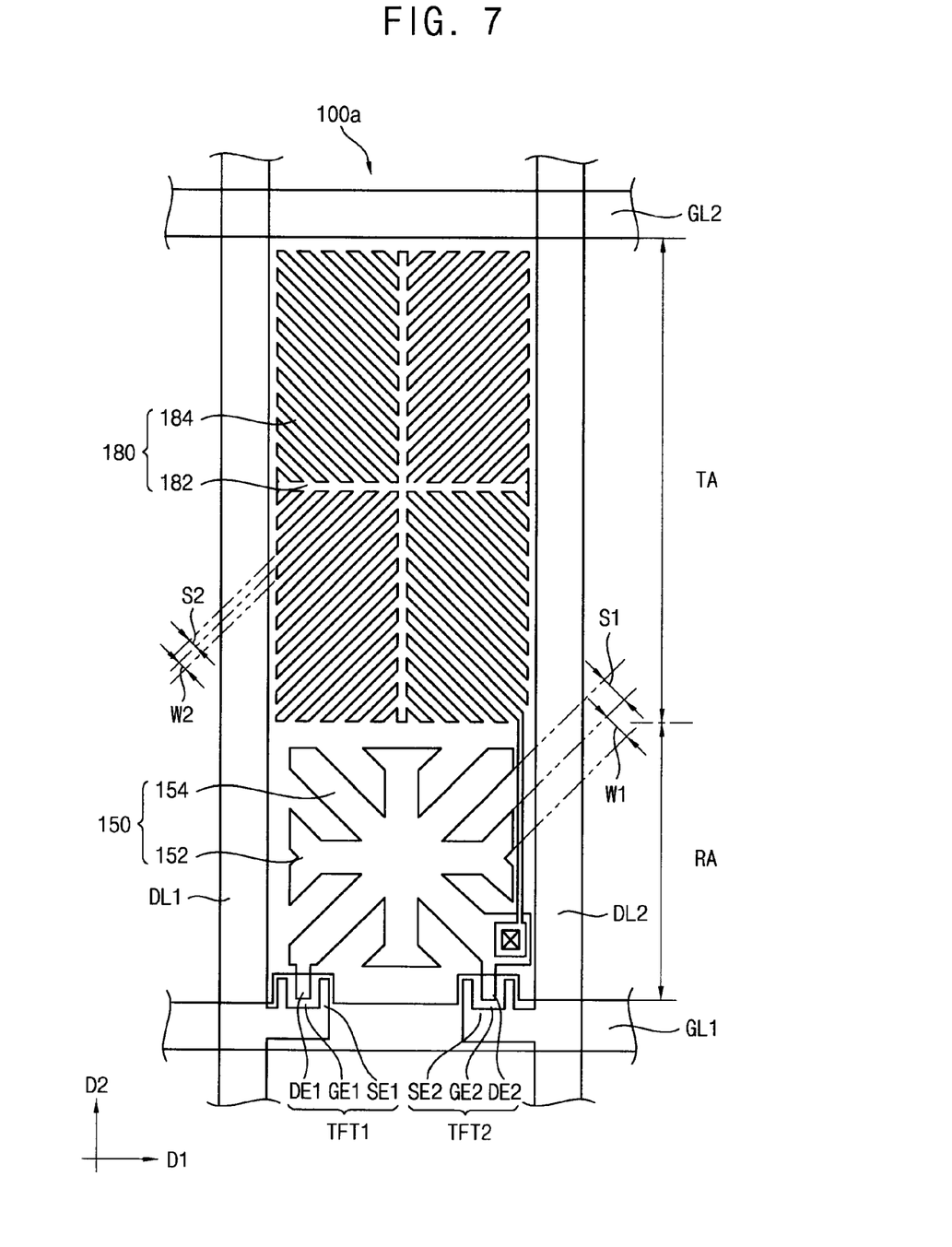
FIG. 7 is a plan view illustrating a display panel according to Embodiment 3 of the present invention.

FIG. 7 is a plan view illustrating a display panel according to Embodiment 3 of the present invention.

The display substrate 100a described in FIG. 7 is substantially identical to the display substrate 100 according to Embodiment 1 except for including two switching elements TFT1 and TFT2 for individually driving the reflective electrode 150 and the transmissive electrode 180. Accordingly, the same reference numerals will be used to refer to the same elements as those described, and any detailed explanation will be omitted.

Referring to HG 7, the display substrate 100a includes a first gate line GL1, a second gate line GL2, a first data line DL1, a second data line DL2, a first switching element TFT1 connected to the first gate line GL1 and the first data line DL1, and a second switching element TFT2 connected to the first gate line GL1 and the second data line DL2. Each of the first and second gate lines GL1 and GL2 is crossing the first and second data lines DL1 and DL2. The first data line DL1 transmits a first voltage, and a second data line DL2 transmits a second voltage different from the first voltage.

The first switching element TFT1 includes a first gate electrode GE1, a first source electrode SE1 and a first drain electrode DE1. The first gate electrode GE1 is electrically connected to the first gate line GL1, and the first source electrode SE1 is electrically connected to the first data line DL1. The first drain electrode DE1 is physically and electrically connected to the reflective electrode 150 disposed in the reflective area RA.

The second switching element TFT2 includes a second gate electrode GE2, a second source electrode SE2 and a second drain electrode DE2. The second gate electrode GE2 is electrically connected to the first gate line GL1, and the second source electrode SE2 is electrically connected to the second data line DL2. The second drain electrode DE2 is electrically connected to a transmissive electrode 180 substantially disposed in the transmissive area TA.

The display substrate 100a may further include a reflective electrode 150 and the transmissive electrode 180. The reflective electrode 150 is extended from the first drain electrode DE1 of the first switching element TFT1 and from the second drain electrode DE2 of the second switching element TFT2, to be substantially disposed in the reflective area RA of pixel area P. The transmissive electrode 180 is electrically connected to the second drain electrode DE2 of the second switching element TFT2, and is substantially disposed in the transmissive area TA of the pixel area P. The transmissive electrode 180 includes a first portion substantially disposed in the transmissive area TA in a upper portion of the pixel area P and a second portion extended from the first portion to be connected to the second drain electrode DE2 of the second switching element TFT2.

The reflective electrode 150 is disposed continuously with and contacting the first drain electrode DE1 to be electrically connected to the first switching element TFT1. The reflective electrode 150 includes a plurality of first electrode portions 154. A width W1 of the first electrode portions 154 may be substantially identical to an interval S1 between the first electrode portions 154 which are adjacent to each other, or may be larger than the interval S1. When the width W1 of the first electrode portions 154 is larger than the interval S1 between the adjacent first electrode portions 154, the reflection efficiency of the reflective area RA may be improved.

The transmissive electrode 180 is electrically connected to a terminal of the second drain electrode DE2 through a contact hole 175. The transmissive electrode 180 includes a plurality of second electrode portions 184. A width W2 of the second electrode portions 184 may be substantially identical to an interval S2 between the adjacent second electrode portions 184. The width W2 of the second electrode portions 184 and the interval S2 between the second electrode portions 184 are smaller than both the width W1 of the first electrode portions 154 and the interval S1 between the first electrode portions 154.

The process for forming the display substrate 100a is substantially identical to the process for forming the display substrate 100 described in FIGS. 3A to 3C according to Embodiment 1. Accordingly, the same reference numerals will be used to refer to the same elements as those described, and any detailed explanation will be omitted.

In the illustrated embodiment, a width W and an interval S of the reflective electrode 150 and the transmissive electrode 180 are different from each other. Voltages different from each other are applied to the reflective electrode 150 and the transmissive electrode 180. Accordingly, the phase delay may be advantageously compensated for.

According to the illustrated embodiments of a display panel, a reflective electrode is disposed on the same plane (e.g., layer) as that of a drain electrode of a switching element, and includes the same material as that of the drain electrode. When a light-blocking member is disposed on the display panel, a reflective area includes an embossing shape. Advantageously, the reflection efficiency of the reflective area may be improved, and a process of manufacturing may be simplified. In addition, as electrode patterns of the reflective electrode and the transmissive electrode are disposed differently from each other in shape and/or dimension (e.g., width W and/or interval S), a phase delay in the reflective area and the transmissive area may be compensated for even if cell gaps of the liquid crystal layer different from each other are not disposed in the reflective area and the transmissive area.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display substrate comprising:
   a base substrate in which a pixel area including a reflective area and a transmissive area are defined;
   a gate line connected to a gate electrode;
   a first insulation layer disposed on the gate line;
   a semiconductor layer disposed on the gate electrode and the first insulation layer;
   a data line disposed on the first insulation layer, the data line crossing the gate line;
   a switching element defined by the gate electrode, a source electrode extended from and continuous with the data line to overlap with a first end portion of the semiconductor layer, and a drain electrode spaced apart from the source electrode to overlap with a second end portion of the semiconductor layer;
   a light-blocking member including a first light-blocking part disposed overlapping an area where the gate line and the data line are both disposed, and a second light-blocking part disposed in the reflective area and including an embossing pattern;
   a reflective electrode disposed on the embossing pattern of the second light-blocking part;
   a second insulation layer disposed overlapping the reflective electrode, the reflective electrode disposed between the second light-blocking part and the second insulation layer; and
   a transmissive electrode disposed on a portion of the second insulation layer overlapping the transmissive area.

2. The display substrate of claim 1, wherein
the reflective electrode comprises a plurality of a first electrode portion having a first width, and
the transmissive electrode comprises a plurality of a second electrode portion having a second width smaller than the first width.

3. The display substrate of claim 2, wherein each of the widths of the first electrode portions is larger than a first interval between first electrode portions adjacent to each other.

4. The display substrate of claim 1, further comprising:
a protective layer disposed on the base substrate, the second insulation layer disposed between the protective layer and the base substrate.

5. The display substrate of claim 4, wherein a thickness of the second insulation layer disposed in the reflective area is larger than a thickness of the second insulation layer disposed in the transmissive area, the thicknesses taken in a direction substantially perpendicular to the first base substrate.

6. The display substrate of claim 5, wherein the second insulation layer is a color filter layer.

7. A display panel comprising:
a display substrate comprising:
a base substrate in which a pixel area including a reflective area and a transmissive area is defined;
a gate line connected to a gate electrode;
a first insulation layer disposed on the gate line;
a semiconductor layer disposed on the gate electrode and the first insulation layer;
a data line disposed on the first insulation layer, the data line crossing the gate line;
a switching element defined by the gate electrode, a source electrode extended from the data line to overlap with a first end portion of the semiconductor layer, and a drain electrode spaced apart from the source electrode to overlap with a second end portion of the semiconductor layer;
a light-blocking member including a first light-blocking part disposed overlapping an area where the gate line and the data line are disposed, and a second light-blocking part disposed in the reflective area and including an embossing pattern;
a reflective electrode disposed overlapping the embossing pattern of the second light-blocking part;
a second insulation layer disposed in the pixel area of the reflective electrode, the reflective electrode disposed between the second light-blocking part and the second insulation layer; and
a transmissive electrode disposed on the second insulation layer in the transmissive area;
an opposite substrate comprising a common electrode disposed overlapping the reflective and transmissive electrodes; and
a liquid crystal layer interposed between the display substrate and the opposite substrate.

8. The display panel of claim 7, wherein the reflective electrode comprises a plurality of a first electrode portion having a first width, and the transmissive electrode comprises a plurality of a second electrode portion having a second width which is smaller than the first width.

9. The display panel of claim 8, wherein each width of the first electrode portions is greater than or equal to an interval between second electrode portions adjacent to each other.

10. The display panel of claim 7, wherein the common electrode has a substantially planar structure.

11. The display panel of claim 7, wherein the display substrate further comprises a protective layer disposed on the base substrate, the second insulation layer being disposed between the protective layer and the base substrate.

12. The display panel of claim 11, wherein a thickness of the second insulation layer disposed in the reflective area is greater than or equal to a thickness of the second insulation layer disposed in the transmissive area.

13. The display panel of claim 12, wherein the second insulation layer is a color filter layer.

14. The display panel of claim 7, wherein a cell gap of the liquid crystal layer overlapping the reflective area is substantially equal to a cell gap of the liquid crystal layer overlapping the transmissive area.

* * * * *